United States Patent [19]

Kraemer

[11] 4,247,233

[45] Jan. 27, 1981

[54] MICRO-ADJUSTABLE BORING BAR

[75] Inventor: Rolf H. Kraemer, Gurnee, Ill.

[73] Assignee: Fansteel Inc., North Chicago, Ill.

[21] Appl. No.: 34,447

[22] Filed: Apr. 30, 1979

[51] Int. Cl.³ .............................................. B23B 29/03
[52] U.S. Cl. .................................... 408/185; 408/153; 408/197
[58] Field of Search ............... 408/185, 181, 153, 146, 408/147, 197, 198, 199, 226, 238; 407/45, 37

[56] References Cited

U.S. PATENT DOCUMENTS

| 3,486,401 | 12/1969 | Kelm ...................................... 408/181 |
| 3,516,134 | 6/1970 | Heuser .................................... 407/37 |
| 3,635,572 | 1/1972 | Robinson .............................. 408/185 |

FOREIGN PATENT DOCUMENTS 977537  11/1975  Canada ...................................... 408/197
157329  12/1956  Sweden ..................................... 408/185

Primary Examiner—Leonidas Vlachos
Attorney, Agent, or Firm—Barnes, Kisselle, Raisch & Choate

[57] ABSTRACT

A micro-adjustable boring bar with an interchangeable head and cartridge utilizing a micro-adjustable key and a stationary key with an adjustment screw mounted independently on a boring bar, and a replaceable and interchangeable head having a recess for the adjustable key and a slot for the stationary key, the slots in both the boring bar and the head being open ended for easy machining.

7 Claims, 17 Drawing Figures

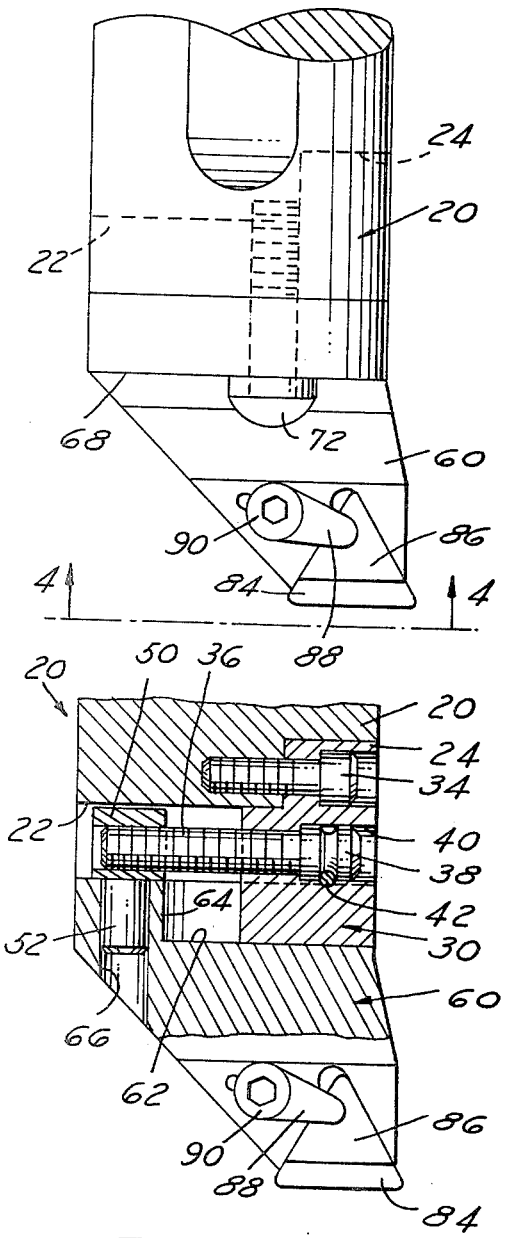
Fig.-1
Fig.-3
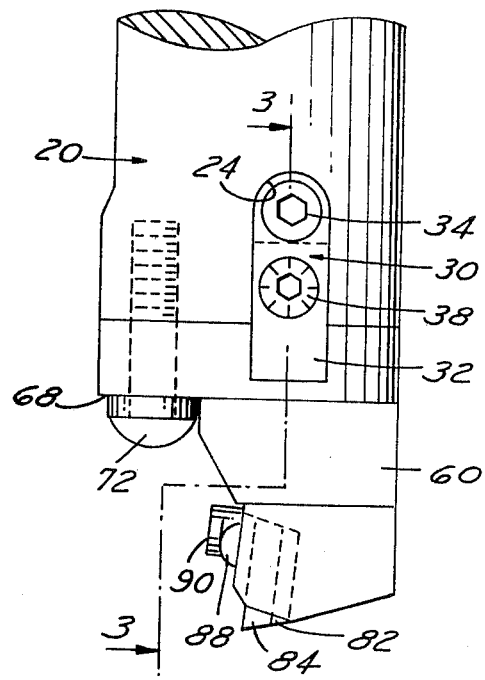
Fig.-2
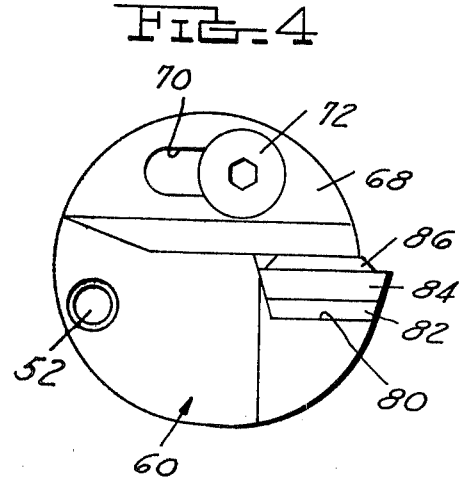
Fig.-4

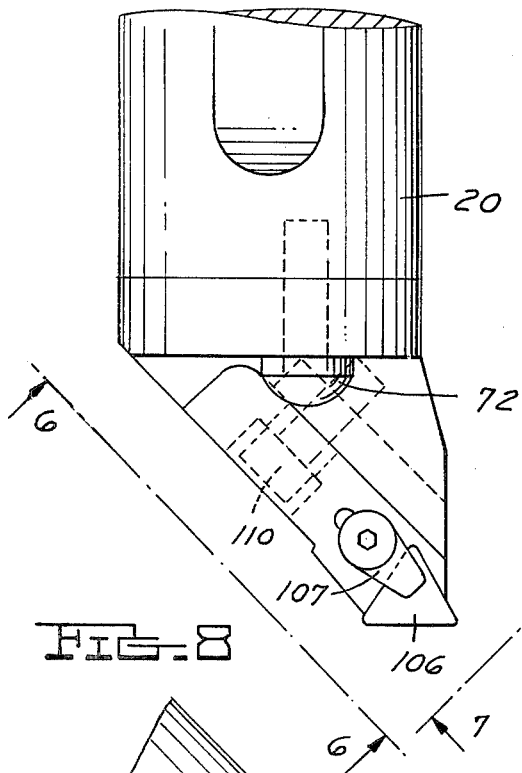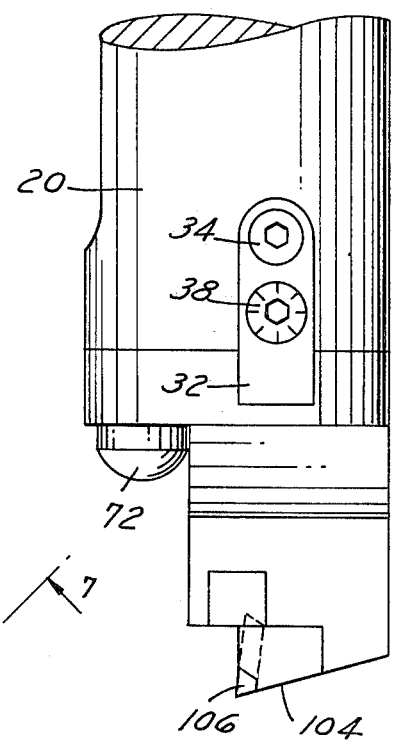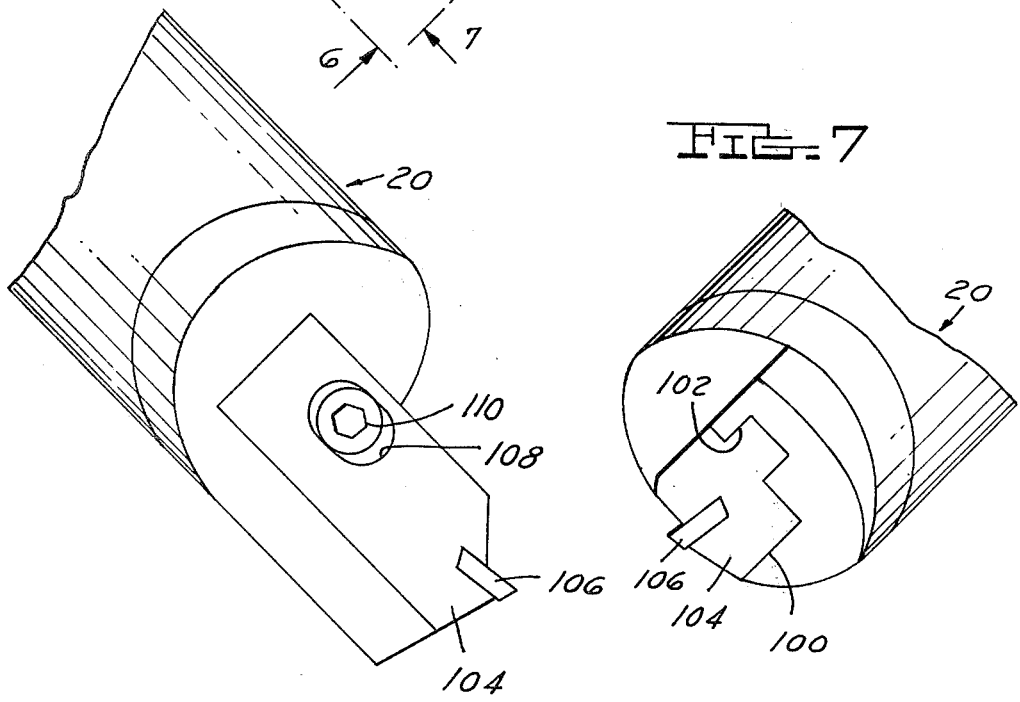

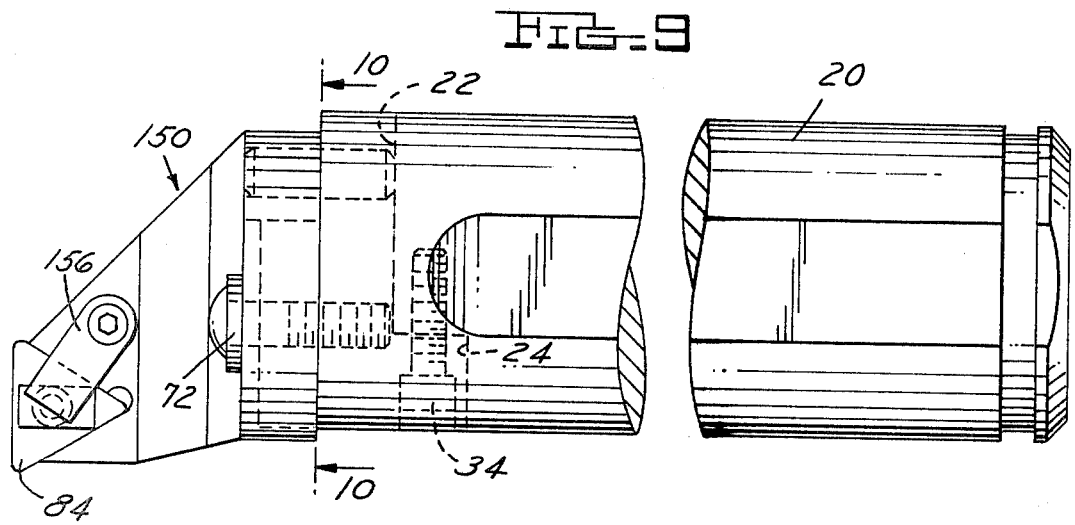
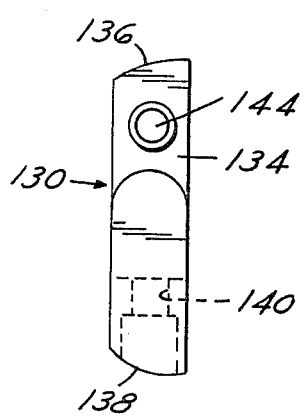
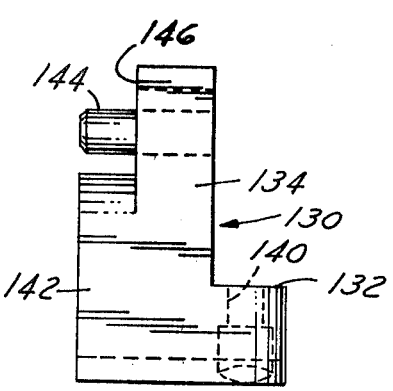
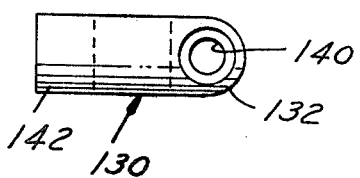
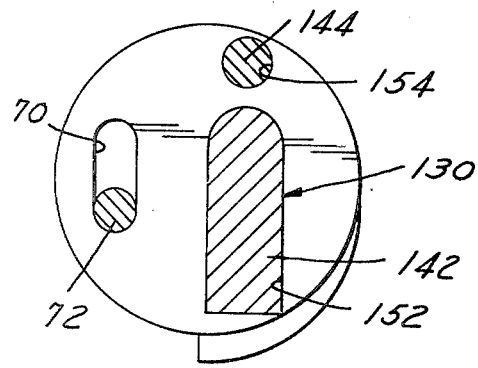

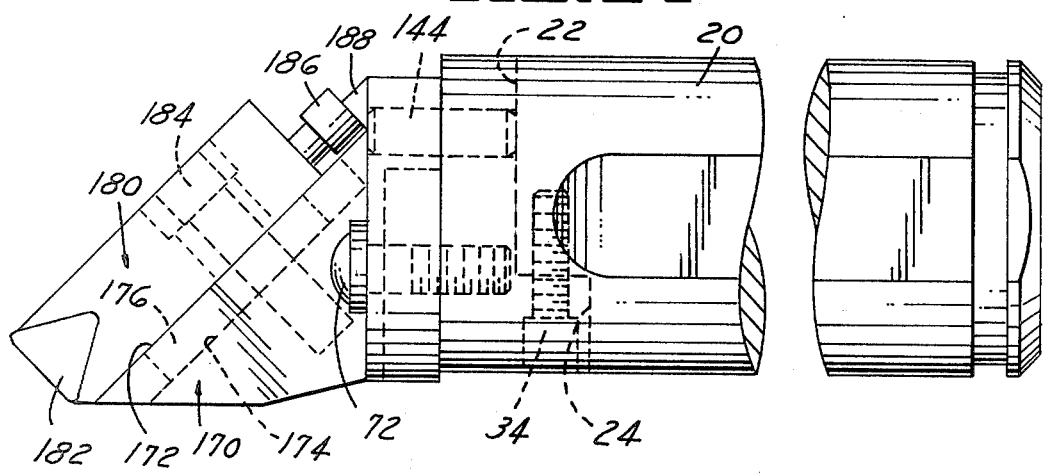
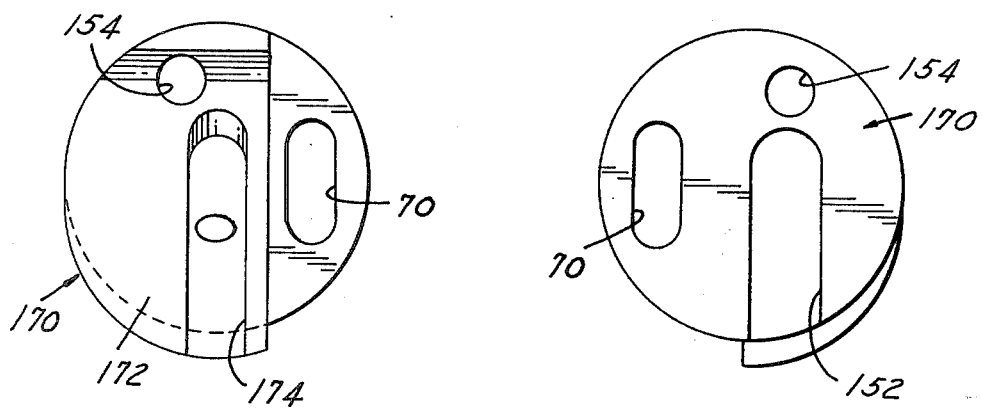
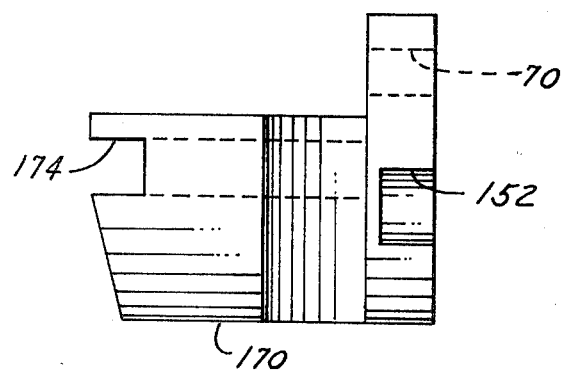

MICRO-ADJUSTABLE BORING BAR

BACKGROUND OF INVENTION

Adjustable boring bars are common in the art with radial adjustments being possible in various ways. With the advent of tape controlled machines and automation equipment, it has become extremely important to be able to change tooling rapidly without changing the intended dimension. Many tools are single purpose tools in a single location in a machine. Thus, when a tool point wears or breaks, it must be replaced quickly to avoid a long shut down of the machine.

Thus, it is an object to provide a boring bar and head which is simple in construction with a minimum of parts which can be readily disassembled and replaced with accurate relocation. The present invention is intended to be an improvement on the disclosure in the U.S. patents to Kelm U.S. Pat. Nos. 3,486,401 (1969) and Heuser 3,516,134 (1970) in the reduction of the parts required, the ease of machining, the interchangeability of the boring heads, and the locking means for the head.

In addition, the present invention provides a construction with open ended slots readily machined and ground for accuracy, eliminating the need for complex machining operations in either the boring bar or the head.

Other objects and features of the invention will be apparent in the following description and claims in which the principles of the invention are set forth together with details of construction directed to tool makers skilled in the art to enable them to make and use the invention, all in connection with the best modes presently contemplated for the practice of the invention.

BRIEF DESCRIPTION OF THE DRAWINGS

Drawings accompany the disclosure and the various views thereof may be briefly described as:

FIG. 1, a top view of an assembled boring bar constructed in accordance with the present invention.

FIG. 2, a side view of the boring bar assembly.

FIG. 3, a longitudinal sectional view on line 3—3 of FIG. 2.

FIG. 4, an end view on line 4—4 of FIG. 1.

FIG. 5, a plan view of a modified boring head with a replaceable cartridge.

FIG. 6, a side view of the embodiment of FIG. 5 on line 6—6 of FIG. 5.

FIG. 7, an end view on line 7—7 of FIG. 5.

FIG. 8, a perspective view of the assembly of FIG. 5.

FIG. 9, a modified structure showing a fixed boring head.

FIG. 10, a sectional view on line 10—10 of FIG. 9.

FIG. 11, an elevation of the insertable end of a locator key.

FIG. 12, a side view of the locator key.

FIG. 13, an end view of the exposed end of the locator key.

FIG. 14, another embodiment of the fixed boring head carrying an adjustable cartridge.

FIG. 15, a view of the boring bar end of the boring head.

FIG. 16, a view of the cartridge end of the head.

FIG. 17, a side view of the cartridge type boring head.

DETAILED DESCRIPTION OF THE DISCLOSED EMBODIMENTS

In FIGS. 1 to 4, a first embodiment of the boring bar and boring head is shown. A boring bar shaft 20 has milled in the outer end a diametrical slot 22 with side walls in parallel planes which in turn are parallel to the axis of the bar. The slot 22 is deepened at one end to provide a side recess 24 with a semi-circular wall connecting flat side walls. A locator adjustment key block 30 has a rounded end to seat in the recess 24 with a portion fitted in slot 22 and a portion extending beyond the boring bar at 32. The locator key has an L-shape so that a corner portion of the L interfits with the junction corner of slots 22 and 24 (FIG. 3). A socket head screw 34 threaded into the boring bar secures the key block 30 rigidly in the boring bar.

A micro-adjustment screw 36 with a graduated head 38 is fitted into a counterbored recess 40 and retained by a cross pin 42 acting in a groove in the head 38. The shaft of screw 36 threads into a square base of an adjustable key 50 slidably movable in slot 22. Thus, rotation of screw 36 causes transverse movement of the key 50. Extending outwardly from key 50 and from slot 22 is a pin 52.

An adjustable boring head 60 has a circular base with a diameter comparable to the boring bar 20 with a flat bottom surface provided with a diameterical slot 62 with parallel walls to receive the projecting portion of the key 30 in a sliding relationship and relatively close fit. The slot 62 terminates at 64. A hole 66, parallel to the axis of rotation of the assembly and centered with respect to the slot 62, receives pin 52 in a snug fit.

A portion of the boring head 60 is cut away to provide an exposed flat surface 68. An elongate slot 70 is provided through the head at this point to accommodate a headed bolt 72 which will clamp the head against the boring bar.

Thus, when the bolt 72 is tightened, the boring head is secured by the key block 30, the pin 52, and the bolt. By releasing the bolt 72, the screw 36 can be rotated to adjust the transverse key 50 and the position of the boring head.

A suitable pocket 80 is provided on the boring head to receive an anvil insert 82, a cutting insert 84, and a chip breaker 86, all held in place by a clamp 88 locked by a screw 90.

In FIGS. 5 to 8, a modified boring head is shown with identical adjustment connections to the boring bar 20. The head in this embodiment is provided with an angled slot 100 with a second narrower slot 102 in the base of slot 100 to receive a cartridge block 104 carrying a suitable cutting insert 106 held by a clamp 107. An elongate slot 108 in the cartridge receives a bolt 110. Thus, the axial and radial reach of the cutting insert can be adjusted by moving the cartridge after release of bolt 110 while radial adjustment can be accomplished by the action of micro-screw 38.

In FIGS. 9 to 17, additional embodiments of the invention are illustrated. In some cases, it is desirable to have fixed adjustment boring bars which operate at a fixed radius at all times. The present invention lends itself to either a fixed adjustment or a variable adjustment condition. This reduces the inventory needed for the flexibility desired and allows a single boring bar drive to be used for either condition.

To accomplish the above objective, a boring bar 20 is shown in FIGS. 9 and 14 having the same configuration as that illustrated in FIGS. 1 to 6.

The diametrical slot 22 with the deepened portion 24 is identical in all of the boring bars. However, the locator block in these embodiments of FIGS. 9 to 17 extends diametrically across the entire boring bar filling the slots 22 and 24. In FIGS. 11, 12 and 13, this stationary block 130 is illustrated having a portion 132 to fit the recess 24 and a main body 134 to extend across the entire bar with rounded ends 136 and 138 to conform the contour of the bar 20. A counterbored hole 140 receives the holding screw 34. A portion 142 extends out of the boring bar slot 22 to serve as a locator for a boring head and a dowel pin 144 projects upwardly from surface to engage a boring head.

The boring head 150 has an elongate recess 152 to receive extension 142 of block 130 and a hole 154 to receive pin 144. See sectional view in FIG. 10. A fastening headed screw 72 functions to clamp the boring head 150 securely in the fixed position in FIGS. 9 to 13 as was shown in the embodiment of FIGS. 1 to 4. The boring head otherwise is the same as in FIG. 1 with a cutting insert 84 and a clamp 156.

In FIGS. 14 to 17, another boring head 170 for use in a fixed position is illustrated. This boring head 170 affixes to the boring bar 20 in the same manner as that shown and described in connection with FIGS. 9 to 13. This boring head 170 has an angled surface 172 as shown in FIG. 14 with a milled slot 174 to receive a rib 176 formed on the bottom of an insert cartridge 180 carrying a replaceable and indexable cutting insert 182. A headed bolt 184 is threaded into a tapped hole in the boring head. This bolt passes through a counterbored slot 184 in the cartridge 80 so that, when loosened, the cartridge can be moved longitudinally. A back-up screw 186 seats against a back-up abutment 188 on the boring head to position the cartridge longitudinally.

The effect of the L-shaped key block in conjunction with the pins extending, respectively, either from the adjustable index block or the stationary key block, rigidly associates the boring head and the boring bar making it possible to utilize not only the replaceable inserts but also the angled cartridge elements to provide additional flexibility for the tool owner. The same boring bar can be used for adjustable or non-adjustable boring heads and with the single clamped insert or the cartridge type tool.

What I claim is:

1. A boring bar and adjustable head combination which comprises:
   (a) a boring bar having an axis of rotation and an L-shaped recess extending across the working end of said bar transverse to said axis and open at each end to the side walls of said bar,
   (b) a key block in said recess secured in one leg of the L and extending into the other leg and beyond the end of said bar,
   (c) a boring head having an axis parallel to the axis of rotation of said boring bar and having on one end a transverse slot perpendicular to said axes and dimensioned to slidably receive an end of said key block, and
   (d) means to lock said boring head in any of a plurality of adjusted positions onto said boring bar.

2. A boring bar combination as defined in claim 1 in which pin means extending in a direction parallel to the extending portion of said key block projects into said boring head from said L-shaped recess.

3. A boring bar combination as defined in claim 1 in which said key block is L-shaped with a portion extending into each leg of said L-shaped recess.

4. A boring bar combination as defined in claim 1 in which said boring head has an angled surface relative to the axis of rotation, and a cutting tool cartridge adjustably mounted on said surface.

5. A boring bar combination as defined in claim 1 in which an index block is slidably positioned in said other leg of said L-shaped recess, an index screw mounted in said key block threaded into said index block, and means interengaging said index block and said boring head to provide transverse adjustment of said boring head.

6. A boring bar combination which comprises:
   (a) a boring bar having an axis of rotation and an L-shaped recess extending across the working end of said bar transverse to said axis and open at each end to the side walls of said bar,
   (b) a key block in said recess secured in one leg of the L and extending into the other leg and beyond the end of said bar,
   (c) an index block slidable in said other leg having a tapped hole,
   (d) an index screw mounted for rotation in said key block and extending into said other leg through the tapped hole in said index block,
   (e) a boring head having an axis parallel to the axis of rotation of said boring bar and having on one end a transverse slot perpendicular to said axes and dimensioned to receive in slidable relation an end of said key block,
   (f) said index block having a projection extending axially of said boring bar into a receiving hole in said boring head, and
   (g) means to lock said boring head onto said boring bar in an adjusted position.

7. A boring bar combination as defined in claim 2 in which said pin means includes an index block slidably positioned in said other leg of said L-shaped recess, an index screw mounted in said key block threaded into said index block, said pin means interengaging said index block and said boring head to provide transverse adjustment of said boring head.

* * * * *